March 29, 1932.  O. H. BANKER  1,851,147
METHOD OF MAKING PLANETARY GEARING
Filed March 30, 1931  2 Sheets-Sheet 1
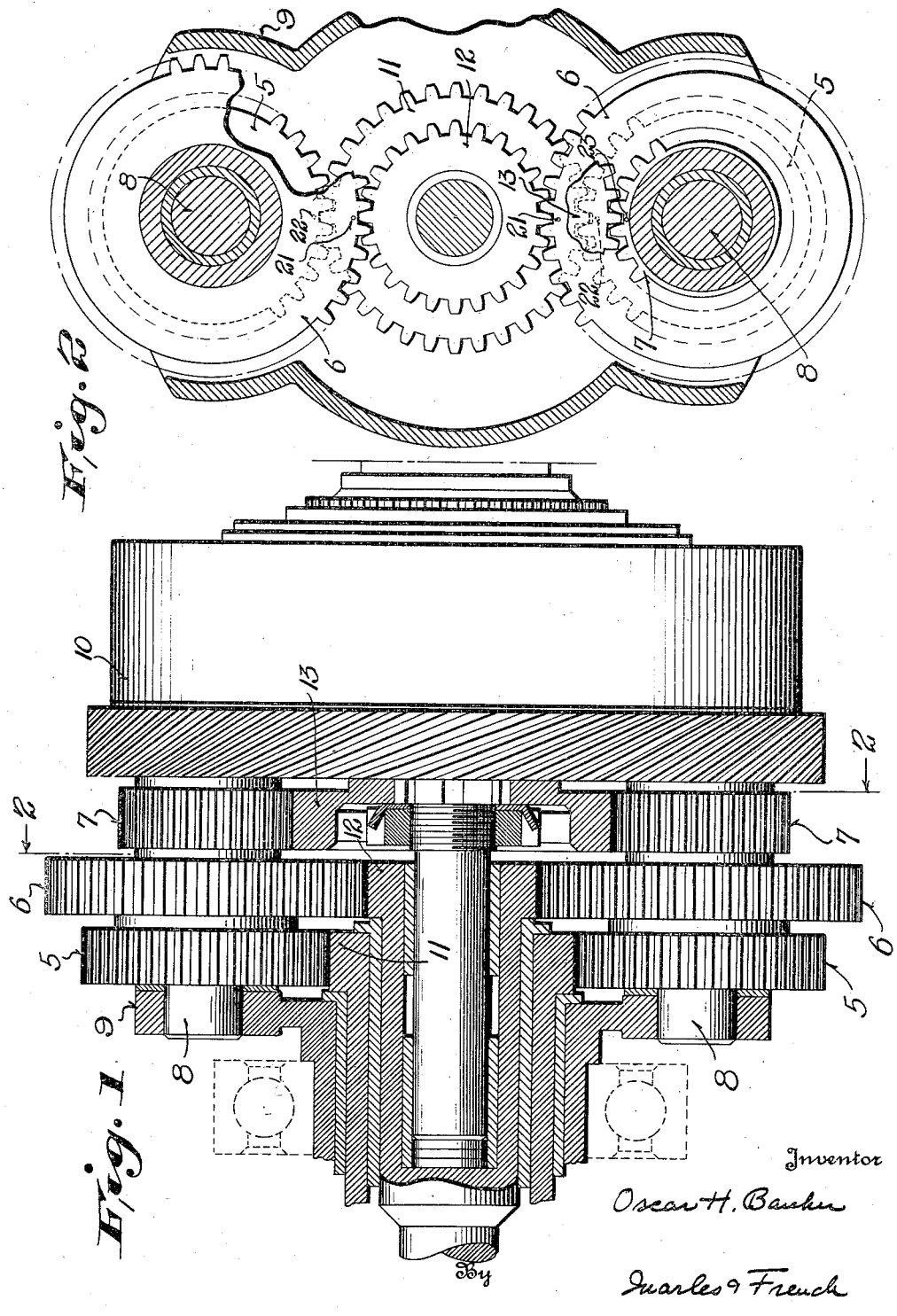
Inventor
Oscar H. Banker
By
Quarles & French
Attorneys March 29, 1932. O. H. BANKER 1,851,147
METHOD OF MAKING PLANETARY GEARING
Filed March 30, 1931 2 Sheets-Sheet 2

Inventor
Oscar H. Banker
By Charles T. French
Attorneys

Patented Mar. 29, 1932

1,851,147

UNITED STATES PATENT OFFICE

OSCAR H. BANKER, OF CHICAGO, ILLINOIS, ASSIGNOR TO CONTINENTAL ILLINOIS BANK & TRUST COMPANY, OF CHICAGO, ILLINOIS, A CORPORATION OF ILLINOIS, AS TRUSTEES

METHOD OF MAKING PLANETARY GEARING

Application filed March 30, 1931. Serial No. 526,255.

The invention relates to planetary gearing and more particularly to method of manufacturing such gearing.

With the usual planetary gearing, there is a tendency for the gears to produce a great deal of noise during operation and this is highly objectionable where such gearing is used in transmissions such as those used for driving automotive vehicles. The object of the present invention is to provide a method of manufacturing planetary gear transmissions wherein the gears will fit accurately when assembled together and wherein the assembled gears will run smoothly and quietly.

The invention further consists in the several features hereinafter set forth and more particularly defined by claims at the conclusion hereof.

In the drawings, Fig. 1 is a view partly in section of a planetary gearing mechanism constructed in accordance with the method;

Fig. 2 is a detail transverse sectional view taken on the line 2—2 of Fig. 1;

Figure 3:
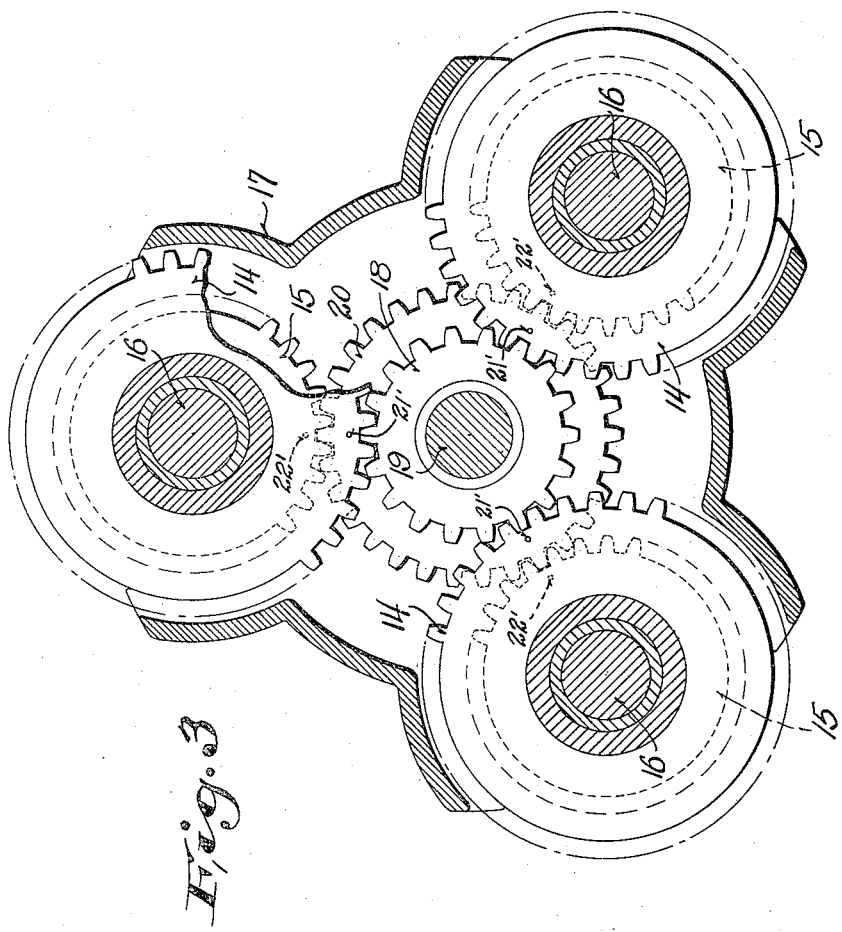
Fig. 3 is a view similar to Fig. 2 showing certain modifications.

In planetary gearing, the planet or orbit gears such as the gears 5, 6 and 7, are mounted as a unit on a shaft 8 of the planetary gear carrier such as the carrier here shown as formed by the elements 9 and 10 and revolve about the sun gears such as the drive gears 11 and 12 and the driven gear 13. In some instances there is only a single drive gear and a driven gear and hence but two planet gears meshing therewith, but there may be more drive gears or planet gears depending upon the particular design. There is generally more than one set, cluster or unit of planet gears, as for example two, three or more, each set mounted on its shaft carried by the planetary gear carrier and in Fig. 2 I have shown two sets of planet gears associated with the drive and driven gears while in Fig. 3 I have shown an arrangement of three sets of planet gears with two planet gears 14 and 15, on the planet shafts 16 of the planetary carrier 17, meshing respectively with the drive gear 18 on the drive shaft 19 and the driven gear 20 associated with the driven shaft.

With such types of gearing, I have found that in order to provide smooth and quiet running and to insure accuracy in assembly that the following method should be followed. First, while the number of teeth in each of the planet gears making up a unit or gear cluster may vary as to each other, the teeth of these gears should be so formed that one tooth space or division in all the gears of such unit should line up as accurately as possible so that one tooth of each of the gears of the planet unit shall have a common center and each of the planet gear clusters or units are so formed.

Second, the sun gears or center gears, such as the drive and driven gears, shall each have such a number of teeth as are evenly divisible by the number of planet gear units or clusters. For example, with a two unit arrangement of planets as shown in Fig. 2, the number of teeth on the drive and driven gears will be in each instance divisible by two while in the arrangement shown in Fig. 3 the number of teeth on the sun gears such as the drive and driven gears shall be divisible by three.

As an aid in assembly, those teeth of each of the gears of a single planet unit or cluster each have their center line marked as by a punch mark 21, 22 and 23 and in assembling these units upon the drive and driven gears, these punch marks are brought into a line passing through the center of the shaft of the unit at the point of mesh as shown in Figs. 2 and 3.

By the foregoing operations, I am enabled to place the planet gears in a true position relative to the sun gears and in a balanced relation therewith and the planet gears can be placed in mesh with the center or sun gears without any special lining up of any individual tooth or teeth of the sun gears with the previously alined teeth of the planet gears.

Such variations in the details of the method as above described and coming within the scope of the appended claims. I desire to be within the spirit of my invention.

What I claim as my invention is:

1. The method of facilitating the assembly and promoting the smooth and quiet running of planetary gearing which consists in forming the gears of each of the planet gear units so that the center line of one tooth division of each gear of said planet gear unit lies along a common center line and forming each of the sun gears of the gearing with numbers of teeth that are divisible by the number of sets of planet gear units with which they engage.

2. The method of facilitating the assembly and promoting the smooth and quiet running of planetary gearing which consists in forming the gears of each of the planet gear units so that the center line of one tooth division of each gear of said planet gear unit lies along a common center line, forming each of the sun gears of the gearing with numbers of teeth that are divisible by the number of sets of planet gear units with which they engage, assembling the sets of planet gear units with the sun gears so that the common center line for each planet gear unit lies in a plane passing through the center of rotation of the sun gears.

In testimony whereof I affix my signature.

OSCAR H. BANKER.